F. BAKER.
VEHICLE SIGNAL.
APPLICATION FILED MAY 24, 1917.

1,302,756.

Patented May 6, 1919.
2 SHEETS—SHEET 1.

Inventor
Frank Baker.
By his Attorney

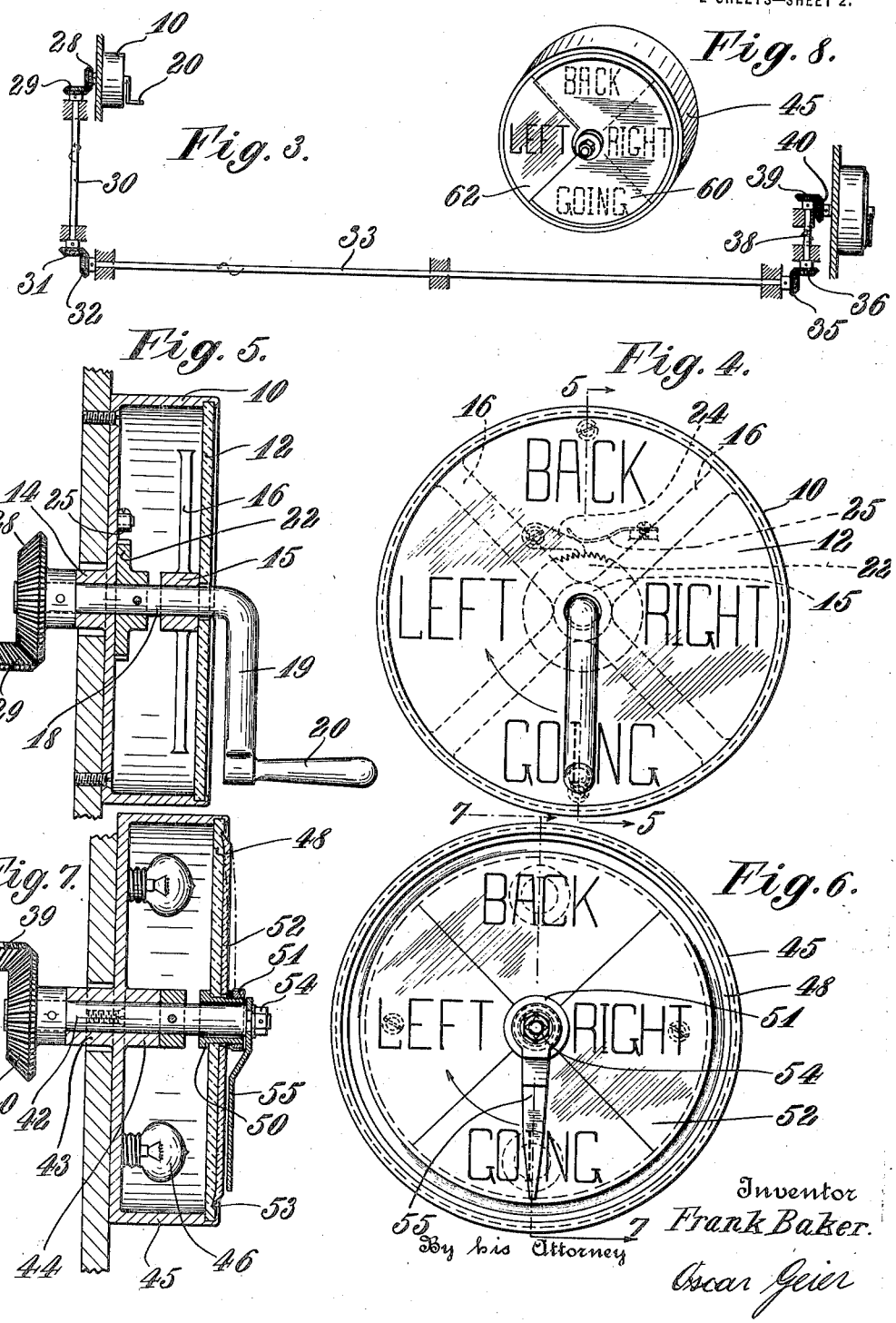

UNITED STATES PATENT OFFICE.

FRANK BAKER, OF BARBERTON, OHIO.

VEHICLE-SIGNAL.

1,302,756.     Specification of Letters Patent.     Patented May 6, 1919.

Application filed May 24, 1917. Serial No. 170,624.

*To all whom it may concern:*

Be it known that I, FRANK BAKER, a subject of the King of Hungary, resident of Barberton, county of Summit, and State of Ohio, have invented certain new and useful Improvements in Vehicle-Signals, of which the following is a specification.

This invention relates to improvements in vehicle signaling devices, and has as its special object the provision of means whereby the proposed action of the vehicle may be clearly indicated at the rear.

A further object is to provide such means comprised of purely mechanical parts, substantial and durable in their nature, and which may be attached to cars of the present type of construction.

These and other like objects are attained by the novel construction and combination of parts hereafter described and shown in the accompanying drawings, forming a material part of this disclosure, and in which:—

Fig. 3 is a side elevational view of the complete device, the same being shown in its simplest form and divested of its supporting connections.

Fig. 4 is a front elevational view showing the indicator and operating means at the front of the car.

Fig. 5 is a transverse sectional view taken on line 5—5 of Fig. 4.

Fig. 6 is a front elevational view of the signal as displayed at the rear of the car.

Fig. 7 is a transverse sectional view taken on line 7—7 of Fig. 6, and

Fig. 8 is a perspective view showing a modified form of signal.

Figure 1:
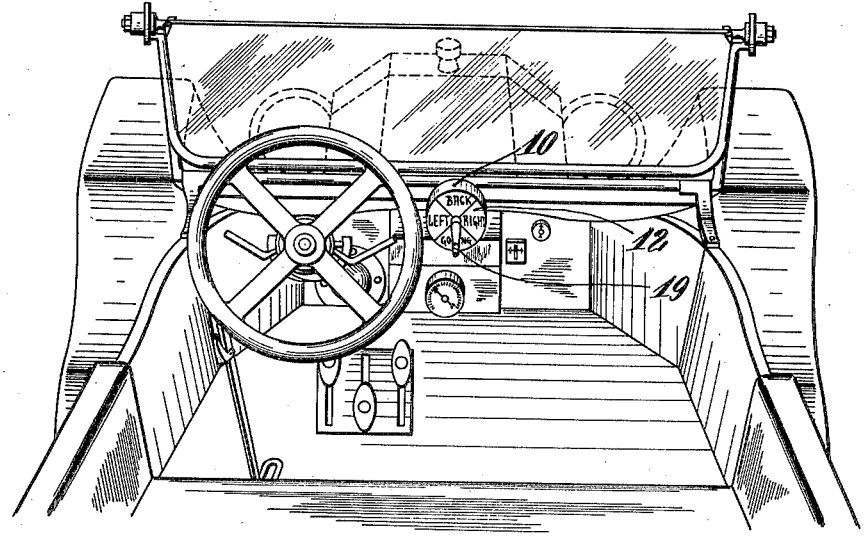
Figure 1 is a perspective view of a conventional type of automobile, looking from the body toward the front thereof.
Figure 2:
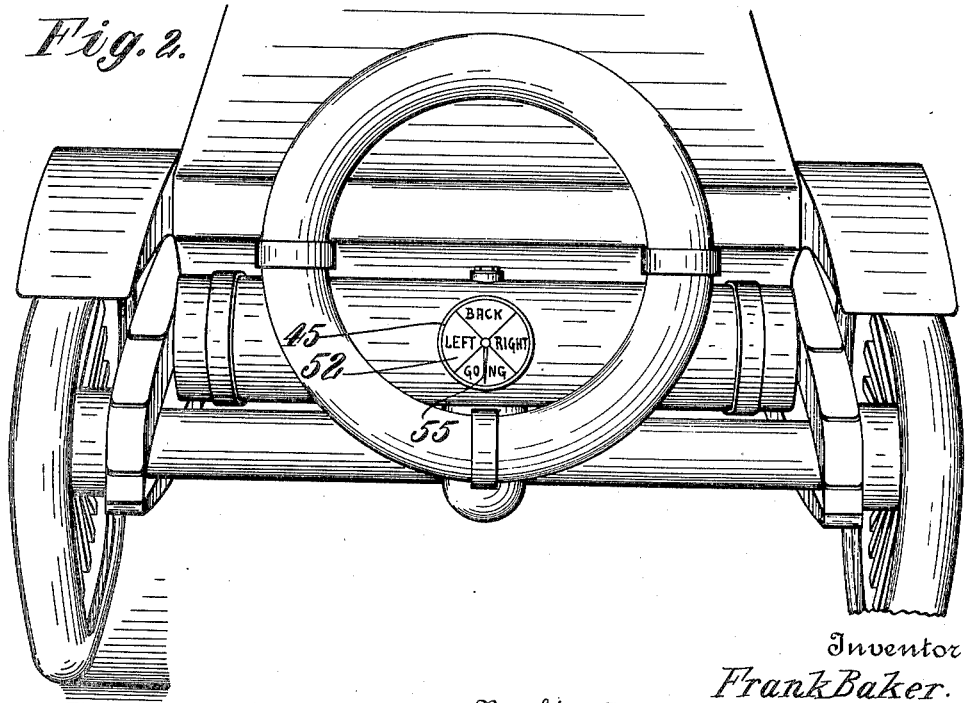
Fig. 2 is a similar perspective view looking from a distance to the rear of the vehicle.

In carrying out of the invention, a hollow cylindrical casing 10 is secured rigidly to the inner front part of the vehicle where it may be readily observed and operated, the same being normally covered by a transparent plate 12, upon the face of which may be inscribed words indicating the direction or action it is proposed to take, as for instance those indicated.

Formed rigidly with the casing 10 is an extending hub 14, the same passing outward through an opening formed on the dasher or other point of support to which the casing is attached, a similar inner hub 15 being near the front of the casing closely adjacent to the transparent plate 12, the outer hub being supported by radial arms 16.

Rotatably mounted in the bearings 14 and 15 is a shaft 18 having an angularly turned extending portion 19, in which is secured a handle 20, by means of which the shaft is rotated.

A ratchet wheel 22 is secured on the shaft 18, and engageable with the teeth thereof is a pawl 24, normally pressed into engagement by means of the flat, curved spring 25, the pawl being pivotally secured to the base of the casing 10, to which is also secured the fixed end of the spring 25.

Upon the oppositely extending end of the shaft 18 is fixed a miter gear 28, meshing with a similar gear 29, rigidly attached to the upper end of a vertical shaft 30, the same being rotatable in suitable bearings and having at its lower end another bevel pinion 31 meshing with a mating gear 32 upon one end of the horizontally disposed shaft 33, disposed in bearings below the platform of the vehicle, and having at its opposite end a fixed bevel gear 35 meshing with a mating gear 36, upon the vertical shaft 38, rotatably mounted and having at its upper end a bevel pinion 39 engaged with a similar pinion 40 rigidly attached to a shaft 42 mounted in a bearing 43 formed in the hub 44 of a second cylindrical casing 45, similar to that first described, and adapted to be attached at any convenient point at the rear of the vehicle.

Within the casing 45 may be mounted one or more electric lamps 46, current to which is supplied from any convenient source of electrical energy carried by the vehicle, the light showing through the transparent cover 48 engaged with a central bushing 50, through which the shaft 42 extends, the hub being secured by a nut 51, which also assists in holding in place a second, normally convex, transparent plate 52, having a sharply beveled annular edge engaging with the corresponding depressions 53 formed annularly near the periphery of the transparent plate 48, the plate 52 being preferably of transparent material, as celluloid or the like, and which obviously can be removed by unscrewing the nut 51 and also the nut 54, engaged on the extreme end of the shaft 42, thereby releasing the index finger 55 permitting the beveled edge of the convex transparent plate 52 to be removed.

Such removal may be occasioned by reason of damaging the surface, and also provides means whereby other inscriptions, characters or symbols from that shown may be readily substituted without change in the mechanism.

In the adaptation shown in Fig. 8, a similar casing 45 containing like operative parts is employed, but in place of the index 55, a segment 60 is used, in which a single display opening 62 is provided and through which the signal can be read, the segment being made of opaque material and rotatably engaged with the shaft in place of the index.

In operation, the parts having been assembled as indicated with relation to the vehicle, and it is desired to announce the forward or going movement, the handle 20 is turned down indicating that the vehicle is about to advance, the same indication being at the rear of the vehicle.

It will also be apparent that an intention to change the direction from left to right may be made to appear or the intention to back the vehicle, thereby preventing possible collisions and accidents.

It will further be observed that all parts are of a mechanical nature, simple, durable and readily operated, and attention is particularly called that the plate bearing the inscription my be readily changed when damaged, or from one inscription to another as may be desired.

Having thus described my invention, what I claim as new, and desire to secure by Letters Patent, is:—

In a signaling device, the combination with a hollow cylindrical casing adapted to be secured at the rear of a vehicle, a cover plate therefor, a shaft mounted axially in said casing, a transparent plate fixed in said casing, said plate having an undercut annular recess formed concentrically in its outer face contiguous to its periphery, a normally convex transparent plate, the edges of said convex plate engaging in the mentioned recess in said fixed transparent plate, means for securing said convex plate in position, an index hand carried by said shaft, and means for manually rotating said shaft and index.

In testimony whereof I have affixed my signature.

FRANK BAKER.